(12) United States Patent
Sharma et al.

(10) Patent No.: US 12,075,444 B2
(45) Date of Patent: *Aug. 27, 2024

(54) METHOD AND SYSTEM FOR MANAGING WIRELESS COMMUNICATION IN VEHICLE-TO-ANYTHING COMMUNICATION SYSTEM

(71) Applicant: Samsung Electronics Co., Ltd., Gyeonggi-do (KR)

(72) Inventors: Neha Sharma, Bangalore (IN); Fasil Abdul Latheef, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,049

(22) Filed: Nov. 28, 2022

(65) Prior Publication Data

US 2023/0090458 A1    Mar. 23, 2023

Related U.S. Application Data

(63) Continuation of application No. 17/201,551, filed on Mar. 15, 2021, now Pat. No. 11,516,795, which is a continuation of application No. 15/727,171, filed on Oct. 6, 2017, now Pat. No. 10,952,194.

(30) Foreign Application Priority Data

Oct. 6, 2016   (IN) .................. PS-2016-41034295
Sep. 18, 2017  (IN) .................. CS-2016-41034295

(51) Int. Cl.
*H04W 72/23*    (2023.01)
*H04W 76/27*    (2018.01)
*H04W 88/02*    (2009.01)
*H04W 88/08*    (2009.01)

(52) U.S. Cl.
CPC .......... *H04W 72/23* (2023.01); *H04W 76/27* (2018.02); *H04W 88/02* (2013.01); *H04W 88/08* (2013.01)

(58) Field of Classification Search
CPC ... H04W 72/023; H04W 76/27; H04W 88/02; H04W 88/08
See application file for complete search history.

(56) References Cited

U.S. PATENT DOCUMENTS

| | | | |
|---|---|---|---|
| 10,356,758 B2 * | 7/2019 | Pan ..................... | H04W 4/06 |
| 10,952,194 B2 * | 3/2021 | Sharma ................ | H04W 76/27 |
| 2017/0019887 A1 * | 1/2017 | Jiang .................... | H04W 72/23 |
| 2018/0048994 A1 * | 2/2018 | Kwon .................. | H04W 4/021 |

(Continued)

OTHER PUBLICATIONS

European Search Report dated Jun. 12, 2024 issued in counterpart application No. 24161058.3-1215, 8 pages.

*Primary Examiner* — Chi H Pham
*Assistant Examiner* — Weibin Huang
(74) *Attorney, Agent, or Firm* — The Farrell Law Firm, P.C.

(57) ABSTRACT

Methods and apparatuses in a sidelink communication system are provided. Configuration information for providing assistance information for a sidelink communication is received from a base station (BS) at a user equipment (UE). The assistance information is transmitted from the UE to the BS in response to the configuration information, in case that a traffic pattern of the UE is changed. The assistance information includes information on the traffic pattern of the UE.

16 Claims, 15 Drawing Sheets

(56) References Cited

U.S. PATENT DOCUMENTS

| | | | |
|---|---|---|---|
| 2018/0132208 A1* | 5/2018 | Pan | H04W 72/20 |
| 2018/0302886 A1* | 10/2018 | Pan | H04W 72/21 |
| 2019/0045521 A1* | 2/2019 | Hong | H04W 72/20 |
| 2019/0313379 A1* | 10/2019 | Lee | H04W 72/21 |
| 2020/0178048 A1* | 6/2020 | Kim | H04W 12/062 |

* cited by examiner

| Index | LCID values |
|---|---|
| 00000 | CCCH |
| 00001-01010 | Identity of the logical channel |
| 01011 | CCCH |
| 01100-10011 | Reserved |
| 10100 | Uplink UE Assistance Information |
| 10101 | Sidelink UE Assistance Information |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Table 1

FIG.10

| R | F2 | E | LCID | Oct 1 |

R/F2/E/LCID sub-header

Table 2

FIG.11

| Index | LCID values |
|---|---|
| 00000 | CCCH |
| 00001-01010 | Identity of the logical channel |
| 01011 | CCCH |
| 01100-10100 | Reserved |
| 10101 | V2X UE Assistance Information |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Table 3

FIG.12

| U/V | F2 | E | LCID | Oct 1 |
|---|---|---|---|---|

R/F2/E/LCID sub-header

Table 4

FIG.13

| R | SPS ID | Periodicity | Oct 1 |
|---|--------|-------------|-------|
| Time offset ||| Oct 2 |

Fixed sized MAC CE for UE assistance

| R | SPS ID | Periodicity | Oct 1 |
|---|--------|-------------|-------|
| Time offset ||| Oct 2 |
| Data Size ||| Oct 3 |

Fixed sized MAC CE for UE assistance with data size field

Table 5

FIG.14

| R | SPS ID1 | Periodicity | Oct 1 |
|---|---------|-------------|-------|
| Time offset ||| Oct 2 |
| ⋮ ||||
| R | SPS IDN | Periodicity | Oct 2N-1 |
| Time offset ||| Oct 2N |

Variable sized MAC CE for UE assistance

| R | SPS ID1 | Periodicity | Oct 1 |
|---|---------|-------------|-------|
| Time offset ||| Oct 2 |
| Data Size ||| Oct 3 |
| ⋮ ||||
| R | SPS IDN | Periodicity | Oct 3N-2 |
| Time offset ||| Oct 3N-1 |
| Data Size ||| Oct 3N |

Variable sized MAC CE for UE assistance with data size field

Table 6

FIG.15

| Index | LCID values |
|---|---|
| 00000 | CCCH |
| 00001-01010 | Identity of the logical channel |
| 01011 | CCCH |
| 01100-10100 | Reserved |
| 10101 | Sidelink SPS Release |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Table 7

FIG.16

| R | F2 | E | LCID | Oct 1 |

R/F2/E/LCID sub-header

Table 8

FIG.17

| SPS8 | SPS7 | SPS6 | SPS5 | SPS4 | SPS3 | SPS2 | SPS1 | Oct 1 |

Table 9

FIG.18

| R | R | R | R | R | SPS ID | | Oct 1 |

Table 10

FIG.19

METHOD AND SYSTEM FOR MANAGING WIRELESS COMMUNICATION IN VEHICLE-TO-ANYTHING COMMUNICATION SYSTEM

PRIORITY

This application is a Continuation of U.S. patent application Ser. No. 17/201,551, filed in the U.S. Patent and Trademark Office (USPTO) on Mar. 15, 2021, which is a Continuation of U.S. patent application Ser. No. 15/727,171, filed in the USPTO on Oct. 6, 2017, now U.S. Pat. No. 10,952,194, issued on Mar. 16, 2021, which claims priority under 35 U.S.C. § 119(a) to Indian Provisional Patent Application No. PS-2016-41034295 filed in the Indian Patent Office on Oct. 6, 2016, and Indian Complete Patent Application No. CS-2016-41034295 filed in the Indian Patent Office on Sep. 18, 2017, the contents of each of which are incorporated herein by reference.

BACKGROUND

1. Field of the Disclosure

The present disclosure relates generally to a long-term evolution (LTE) based vehicle to anything (V2X) communication system, and more particularly, to a method and system for handling a dedicated semi-persistent (SPS) resource on a side link and an uplink communication in the LTE based V2X communication system.

2. Description of the Related Art

An LTE-based V2X is desired because a widely deployed LTE-based network may provide for "connected vehicles" (e.g., connected cars) in the vehicle industry. An LTE-based V2X service or communication system can be of the following types a)-c).
  a) Vehicle-To-Vehicle (V2V): V2V communication covers LTE-based communication between vehicles. An evolved universal terrestrial radio access (E-UTRAN) allows user equipments (UEs) in proximity of each other to exchange V2V related information when a permission criteria, an authorization criteria, and a proximity criteria are fulfilled. The proximity criteria can be configured by a mobile network operator (MNO). The UEs supporting the V2V service can exchange information even when not served by the E-UTRAN which supports the V2X service. The UEs supporting a V2V application transmits application layer information (e.g. about location of the vehicle and attributes as part of the V2V service). In order to accommodate different information, a V2V payload must be flexible, and the information can be transmitted periodically according to a configuration provided by the MNO.
  b) Vehicle-To-Pedestrian (V2P): The E-UTRAN allows the UEs that are in proximity to each other to exchange V2P-related information, when permission criteria, authorization criteria and proximity criteria, are fulfilled. The proximity criteria can be configured by the MNO. The UEs supporting a V2P service can exchange information even when not served by the E-UTRAN which supports the V2X service. The UE supporting V2P applications transmits the application layer information, which can be broadcasted by a vehicle with the UE supporting V2X service (e.g., warning to a pedestrian), and/or by a pedestrian with the UE supporting the V2X service (e.g., warning to the vehicle).
  c) Vehicle-To-Infrastructure/Network (V2I/N): V2I/N covers LTE-based communication between the vehicle and a Roadside Unit (RSU) network. The RSU is a stationary infrastructure entity supporting V2X applications that can exchange messages with other entities supporting the V2X applications. The UE supporting the V2I applications sends the application layer information to the RSU. The RSU sends the application layer information to a group of UEs or UE supporting the V2I applications. The V2N is also introduced where one party is a UE and the other party is a serving entity, both supporting the V2N applications and communicating with each other via the LTE network.

V2X can use "co-operative awareness" to provide more intelligent services for end-users. This means that transport entities, such as vehicles, roadside infrastructure, and pedestrians, can collect information received from other vehicles or sensor equipment in the proximity of the vehicle to process and share that information to provide more intelligent services, such as cooperative collision warning or autonomous driving. All these different types of V2X (e.g., V2V/V2P/V2I/V2N) can work over a sidelink PC5 interface as well as uplink Uu interface.

In the LTE-based V2X service or communication system, all the communications are time sensitive and can be dynamic in terms of message size, periodicity and timing. Further, with a single semi-persistent scheduling (SPS), the UE may not be able to utilize SPS resources efficiently in the below conditions a)-c):
  a) When a message arrival time changes (i.e., gets delayed), some SPS grants will remain unused as data not available for transmission,
  b) When the message periodicity changes, a latency of communication and buffering time in the UE increases as the SPS grants are not available during that time, and
  c) When the message size changes, an existing SPS allocation will not be utilized efficiently as it may lead to either waste or scarcity of resources based on the change in the message size.

Thus, there is a need in the art for a method and apparatus that address the above-mentioned disadvantages and shortcomings.

SUMMARY

Aspects of the present disclosure provide a method and apparatus for managing a wireless communication in a V2X communication system.

An aspect of the present disclosure provides a method and apparatus to receive, by a UE, a first signaling message comprising assistance information for reporting a configuration of a V2X communication over at least one channel from a base station (BS).

An aspect of the present disclosure provides a method and apparatus to report, by the UE, assistance information associated with at least one resource pattern required for the V2X communication over the at least one channel to the BS based on the assistance information for reporting the configuration.

An aspect of the present disclosure provides a method and apparatus to receive, by the UE, a second signaling message comprised of one or multiple semi-persistent scheduling (SPS) configuration for the V2X communication over the at least one channel based on the assistance information from the BS.

An aspect of the present disclosure provides a method and apparatus to configure, by the UE, the SPS configuration for the V2X communication over the at least one channel.

An aspect of the present disclosure provides a method and apparatus to release, by the UE, the SPS configuration when a physical downlink control channel (PDCCH) contents indicate an SPS release.

An aspect of the present disclosure provides a method and apparatus to release, by the UE, the SPS configuration when a configured number of empty transmissions on SPS grants is reached.

An aspect of the present disclosure provides a method and apparatus to release, by the UE, the SPS configuration when a timer associated with the SPS configuration is expired.

An aspect of the present disclosure provides a method and apparatus to indicate multiple SPS configurations over a radio resource control (RRC) message.

An aspect of the present disclosure provides a method and apparatus to indicate the UE assistance information through a new Medium Access Control (MAC) Control Element (MAC CE).

According to an aspect of the present disclosure, a method performed by a UE in a sidelink communication system is provided. Configuration information for providing assistance information for a sidelink communication is received from a BS. The assistance information is transmitted to the BS in response to the configuration information, in case that a traffic pattern of the UE is changed. The assistance information includes information on the traffic pattern of the UE.

According to another aspect of the present disclosure, a method performed by a BS in a sidelink communication system is provided. Configuration information for assistance information for a sidelink communication is sent to a UE. The assistance information is received from the UE in response to the configuration information, in case that a traffic pattern of the UE is changed. The assistance information includes information on the traffic pattern of the UE.

According to another aspect of the present disclosure, a UE in a sidelink communication system is provided. The UE includes a transceiver and at least one processor coupled to the transceiver. The at least one processor is configured to receive, from a BS, configuration information for providing assistance information for a sidelink communication, and transmit, to the BS, the assistance information in response to the configuration information, in case that a traffic pattern of the UE is changed. The assistance information includes information on the traffic pattern of the UE.

According to another aspect of the present disclosure, a BS in a sidelink communication system is provided. The BS includes a transceiver and at least one processor coupled to the transceiver. The at least one processor is configured to send, to a UE, configuration information for assistance information for a sidelink communication, and receive, from the UE, the assistance information in response to the configuration information in case that a traffic pattern of the UE is changed. The assistance information includes information on the traffic pattern of the UE.

BRIEF DESCRIPTION OF THE DRAWINGS

The above and other aspects, features, and advantages of the present disclosure will be more apparent from the following description taken in conjunction with the accompanying drawings, in which:

FIG. 10 illustrates a Table 1 showing values of an logical channel identifier (LCID) for an Uplink Shared Channel (UL-SCH), according to the present disclosure;

FIG. 11 illustrates a Table 2 showing a MAC subheader for a MAC CE for the UE assistance information, according to the present disclosure;

FIG. 12 illustrates a Table 3 showing common LCIDs configured for UL and SL MAC CE for the UE assistance information, according to the present disclosure;

FIG. 13 illustrates a Table 4 showing another MAC subheader for the Medium Access Control (MAC) Control Element (MAC CE) for the UE assistance information, according to the present disclosure;

FIG. 14 illustrates a Table 5 showing a format for the MAC CE carrying the UE assistance information, according to the present disclosure;

FIG. 15 illustrates a Table 6 showing a format for the MAC CE carrying the UE assistance information for multiple SPS, according to the present disclosure;

FIG. 16 illustrates a Table 7 showing a logical channel table for the UL-SCH, according to the present disclosure;

FIG. 17 illustrates a Table 8 showing a MAC subheader for release or deactivation of SPS resources, according to the present disclosure; and FIGS. 18 and 19 illustrate a Table 9 and a Table 10, respectively, showing various formats of MAC CE for indication of a SPS release over a sidelink, according to the present disclosure.

DETAILED DESCRIPTION

Figure 1A:
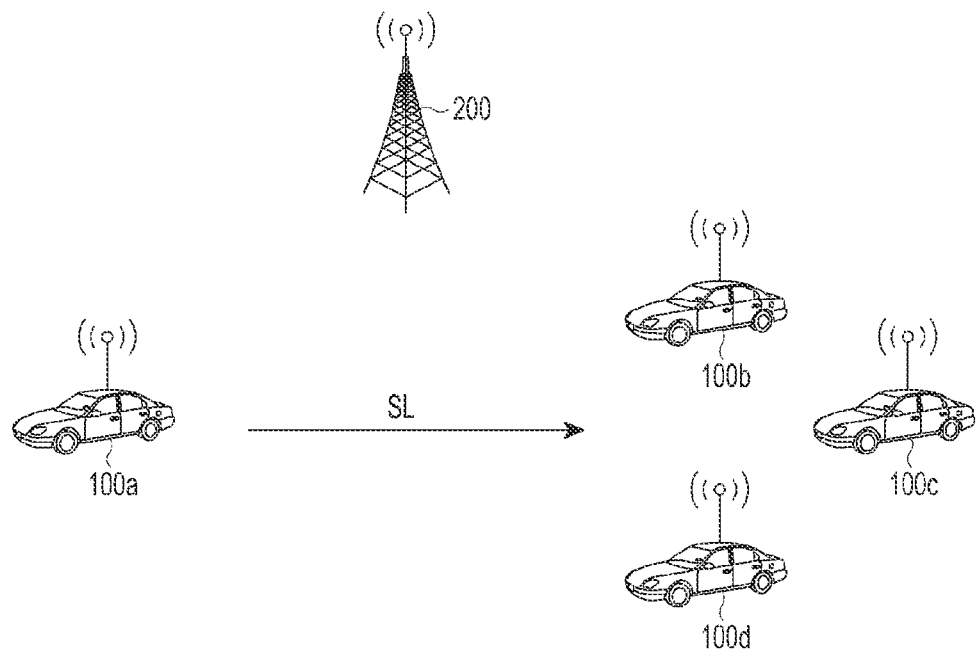
FIG. 1A illustrates a V2V operation scenario based on a PC5 interface.

The embodiments of the present disclosure and the various features and advantageous details thereof are explained more fully with reference to the accompanying drawings. Embodiments described herein are not necessarily mutually exclusive, as some embodiments can be combined with one or more other embodiments to form new embodiments. The term "or", as used herein, is non-exclusive, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, and hardware components, are physically implemented by analog and/or digital circuits such as logic gates, integrated circuits, microprocessors, microcontrollers, memory circuits, passive electronic components, active electronic components, optical components, and hardwired circuits, and may be driven by firmware and software. The circuits may be in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

An aspect of the present disclosure includes a method for managing wireless communication in a V2X communication system. The method includes receiving, by a UE, a first signalling message from a BS. The first signalling message includes assistance information for reporting a configuration for a V2X communication over at least one channel. The method includes reporting, by the UE, assistance information associated with at least one resource pattern required for the V2X communication over at least one channel to the BS based on the assistance information for reporting a configuration. Further, the method includes receiving, by the UE, a second signalling message from the BS. The second signalling message comprises at least one SPS configuration for the V2X communication over the at least one channel based on the assistance information. Further, the method includes configuring, by the UE, the SPS configuration for the V2X communication over the at least one channel. Further, the method includes acknowledging by the UE the configuration of the SPS configuration to the BS.

The method of the present disclosure has been adopted in the TS 36.300, TS 36.321 and TS 36.331 3GPP standards.

The BS can configure multiple SPS configurations for a V2X sidelink and uplink over the RRC message, and the UE needs to send UE assistance information to assist the BS with a traffic pattern. The UE assistance information is reported to the BS upon changes in the UE traffic characteristics for V2X sessions and the report should contain periodicity, timing offset, logical channel id, message size, and sidelink priority info. The new information elements (IEs) are added to a RRC SPS configuration for the V2X configurations with an SPS id and config. Further, a sidelink SPS is released using PDCCH over the RRC message.

The BS can configure the UE to send UE assistance information for the V2X communication through the RRC reconfiguration message, so as to efficiently utilize the allocated resources to improve the V2X service without any latency. The method can be used to optimally configure the SPS in the V2X service by using a traffic pattern in the V2X service.

Referring now to the drawings and more particularly to FIGS. 1 through 9, FIG. 1A illustrates a V2V operation scenario based on a PC5 interface, according to the prior art.

For the TR 36.885 V14.0.0 standard, different V2X operations are explained in FIGS. 1A-1C and FIGS. 2A-2D.

For a V2V service, both a transmitter UE and receiver UE(s) are vehicle types as shown in the FIG. 1A. The UE 100a transmits a V2X message to multiple UEs 100b-100d at a local area through a side link (SL).

Figure 1B:
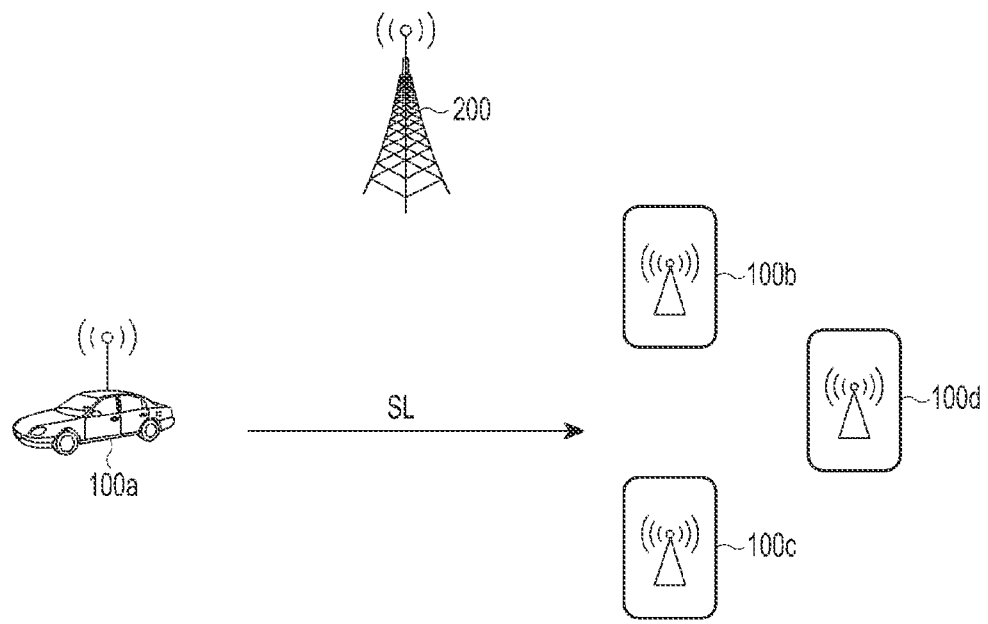
FIG. 1B illustrates a V2I operation scenario based on the PC5 interface.

FIG. 1B illustrates a V2I operation scenario based on the PC5 interface, according to the prior art. For a V2I service, a transmitter UE and a receiver UE(s) are UE-type roadside units (RSUs), as shown in the FIG. 1B. The UE 100a transmits a V2I message to multiple UEs 100b-100d at the local area through the side link.

Figure 1C:
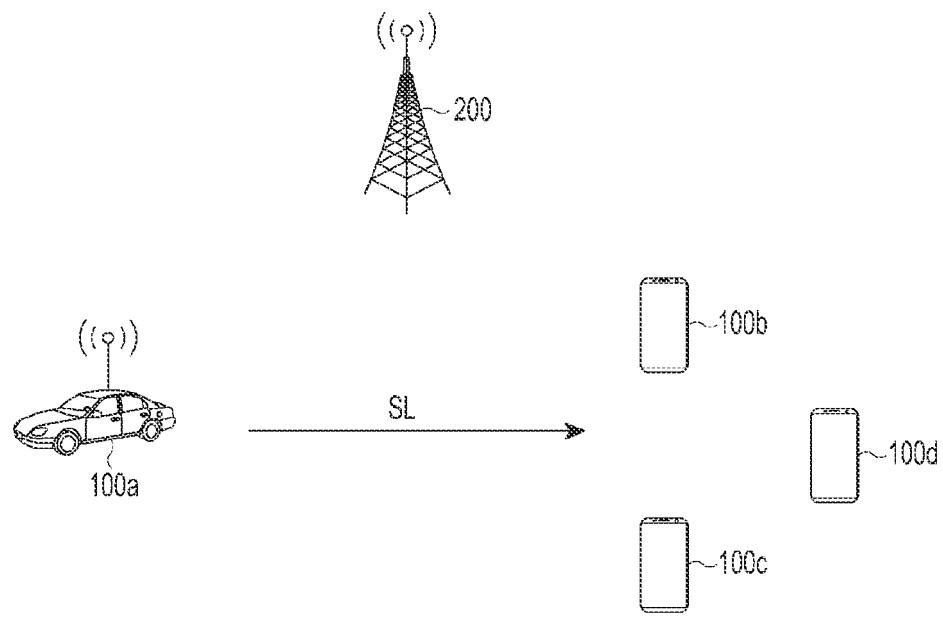
FIG. 1C illustrates a V2P operation scenario based on the PC5 interface, according to the prior art.

FIG. 1C illustrates an overview of a V2P operation scenario based on the PC5 interface, according to the prior art. For a V2P service, a transmitter UE and a receiver UE(s) are pedestrian UEs, as shown in the FIG. 1C. The UE 100a transmits a V2P message to multiple UEs 100b-100d at the local area through the side link.

Figure 2A:
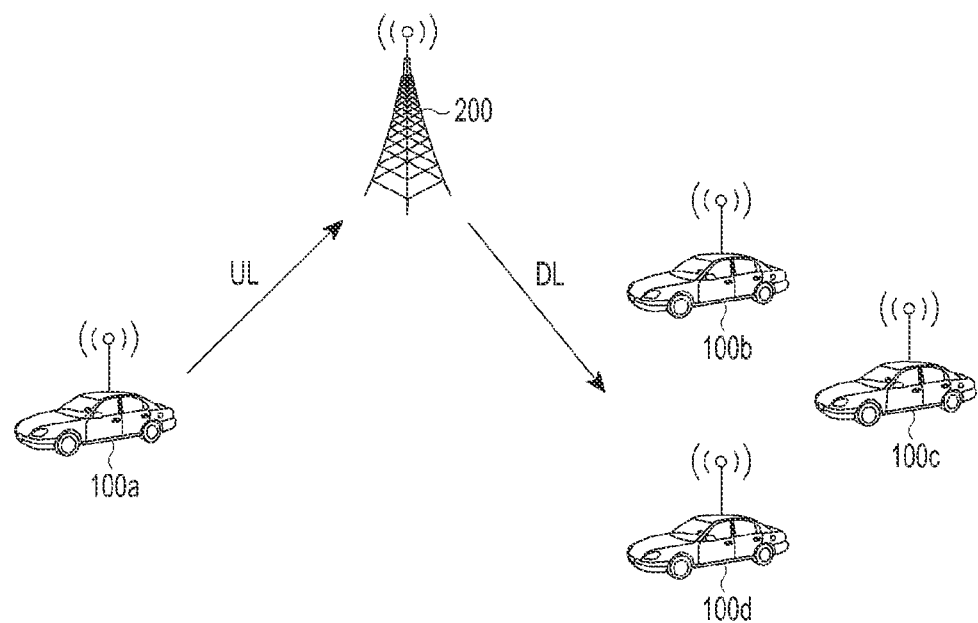
FIG. 2A illustrates the V2V operation based on a Uu interface.
Figure 2B:
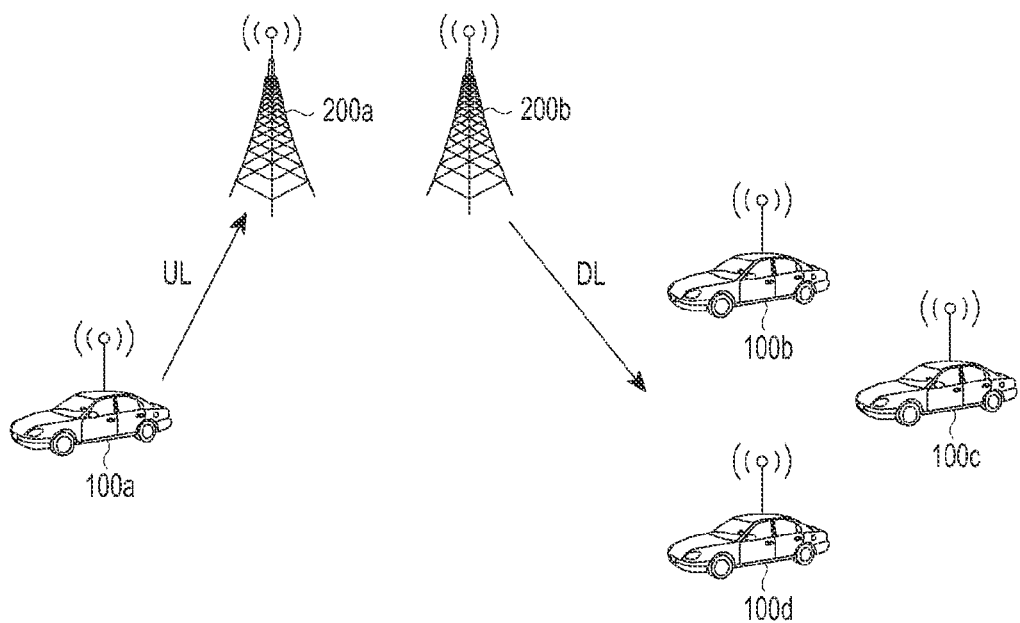
FIG. 2B illustrates the V2I operation based on the Uu interface.

FIG. 2A illustrates the V2V operation based on a Uu interface, according to the prior art. FIG. 2B illustrates the V2I operation based on the Uu interface, according to the prior art.

Figure 2C:
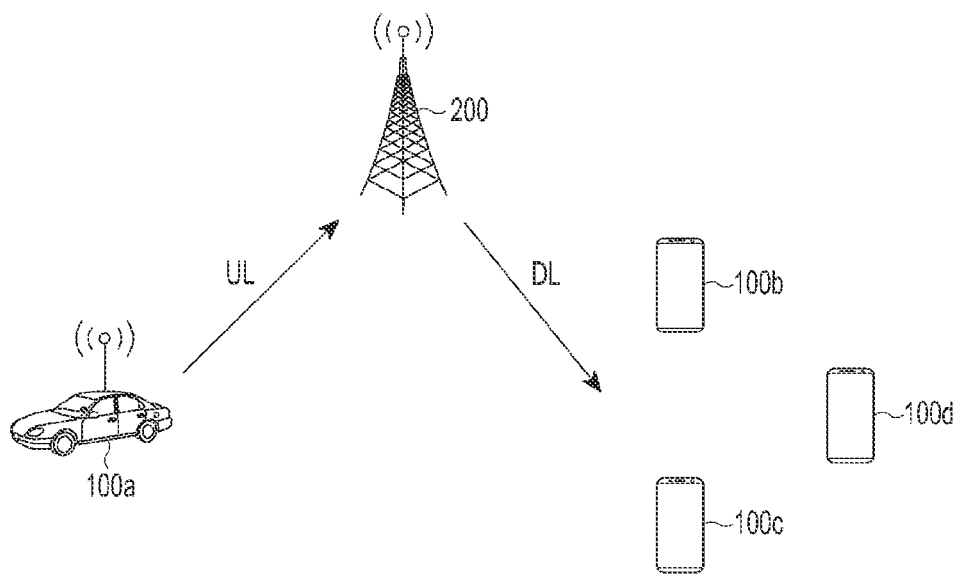
FIG. 2C illustrates the V2P operation based on the Uu interface.
Figure 2D:
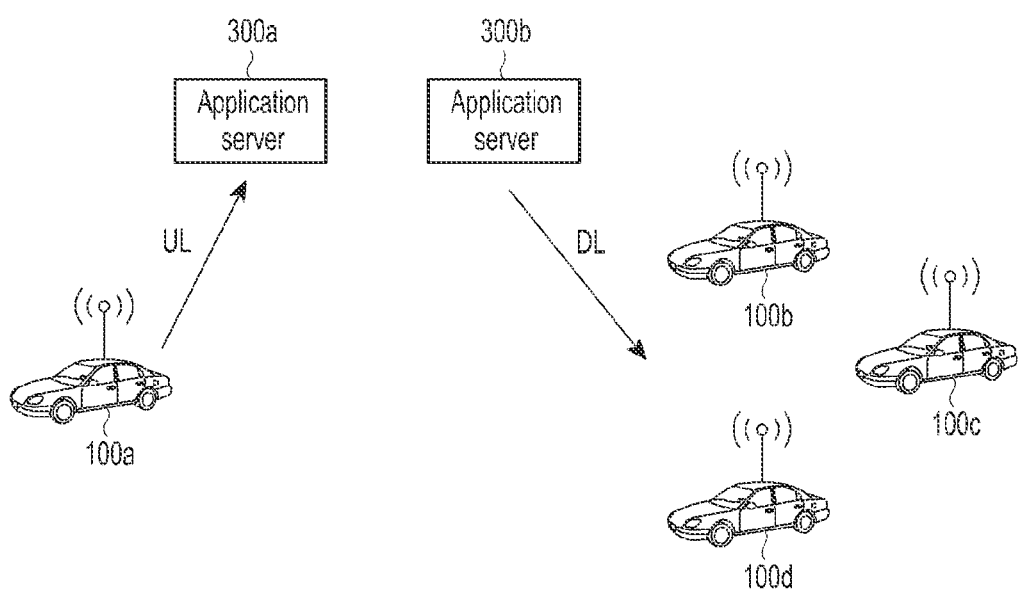
FIG. 2D illustrates the V2N operation based on the Uu interface.

FIG. 2C illustrates the V2P operation based on the Uu interface, according to the prior art. FIG. 2D illustrates an overview of the V2N operation based on the Uu interface, according to prior art.

As shown in the FIGS. 2A-2D, a BS 200 performs an uplink (UL) reception and a downlink (DL) transmission of the V2X messages.

For the V2V service and the V2P service, the UE 100a transmits the V2X message to the BS 200 (e.g., E-UTRAN) in the UL and the BS 200 transmits the V2X message to multiple UEs 100b-100d at a local area through the DL message. For the V2I service, when a receiver is an eNB type RSU 100b-100d, the UE 100a transmits a V2I message to the BS 200 (i.e., eNB type RSU) in the UL message, when the transmitter is an eNB type RSU, the BS 200 (i.e., eNB type RSU) transmits the V2I message to multiple UEs 100b-100d at the local area in the DL message.

For the V2N service, the UE 100 communicates with an application server 300a and 300b (e.g., a traffic safety server).

The different communication systems and services of the V2X are time sensitive and, in accordance with TR 36.885 V14.0, an existing E-UTRAN may not meet the latency requirement for the Uu transport of the V2V/V2X service when a long scheduling request(SR) period (e.g. a longer than 10 ms) is used. Thus, if the Uu transport of V2V/V2X service is used then, the UEs 100 should be configured with a shorter SR period such as 1 ms or 10 ms to meet the latency requirement on the V2V/V2X services. However, it is also observed that configuring physical uplink control channel SR (PUCCH SR) resources with a short SR period such as 1 ms or 10 ms will increase undesirable uplink overhead. Further, the uplink overhead might be severe, particularly when a large number of vehicles exist in a cell (e.g., in an urban setting or when Uu resources are shared with other services).

In addition, it is observed that a cooperative awareness message (CAM) message generation can be dynamic in terms of size, periodicity and timing. Further, changes in the CAM message generation will result in misalignment between a UL SPS timing and a CAM timing. There may be some regularity in size and periodicity between different triggers.

In order to reduce uplink overhead, it is beneficial to use the uplink SPS. In order to avoid added latency in the UE 100 of waiting for the SPS resources, the SPS period would have to be significantly shorter than the latency requirement of 100 ms. For most CAM and decentralized environmental notification message (DENM) periods, this would result in a large amount of signaling overhead when many UEs 100 need to send the information to the BS 200 each time and the UEs 100 do not need to use the resource. Thus, it is desirable to use a long SPS period (e.g., between 100 ms and 1 second) for the V2X service.

Similarly, for the side link communication (i.e., PC5 interface) there is a need to introduce SPS resources based on a data transfer to avoid any delay. There is also a need to introduce dedicated SPS resources for the V2X communication for both Uu as well as PC5 interface, and as there can be traffic of different types, multiple SPS resources need to be supported on both Uu and PC5 interface. This introduction of multiple dedicated SPS resources requires changes in existing systems, as current E-UTRAN system are not capable of handling such requirements. Multiple SPS configurations is one of the enhancements that has been introduced to cater to the requirements of different traffic types, both over PC5 and Uu interfaces.

Multiple SPS configurations with different configuration parameters can be configured by the BS 200 in order to address message characteristics of V2V/V2X service (e.g. CAM, DENM and basic safety message (BSM)), and support both V2V service and a Voice over Internet Protocol (VoIP) service. The SPS, as per current provisions in the 3GPP TS 36.321 specification, is common to all logical channels that are configured. Data on any of the logical channels can be multiplexed to form a transport block (TB), which can be carried over the SPS grants. For the V2X or the V2V type of systems, it has been agreed that multiple SPSs can be supported over the Uu interface as well the PC5 interface simultaneously. This SPS configuration may be mapped to a particular logical channel identifier (LCID) or to prose per packet priority (PPPP).

Figure 3:
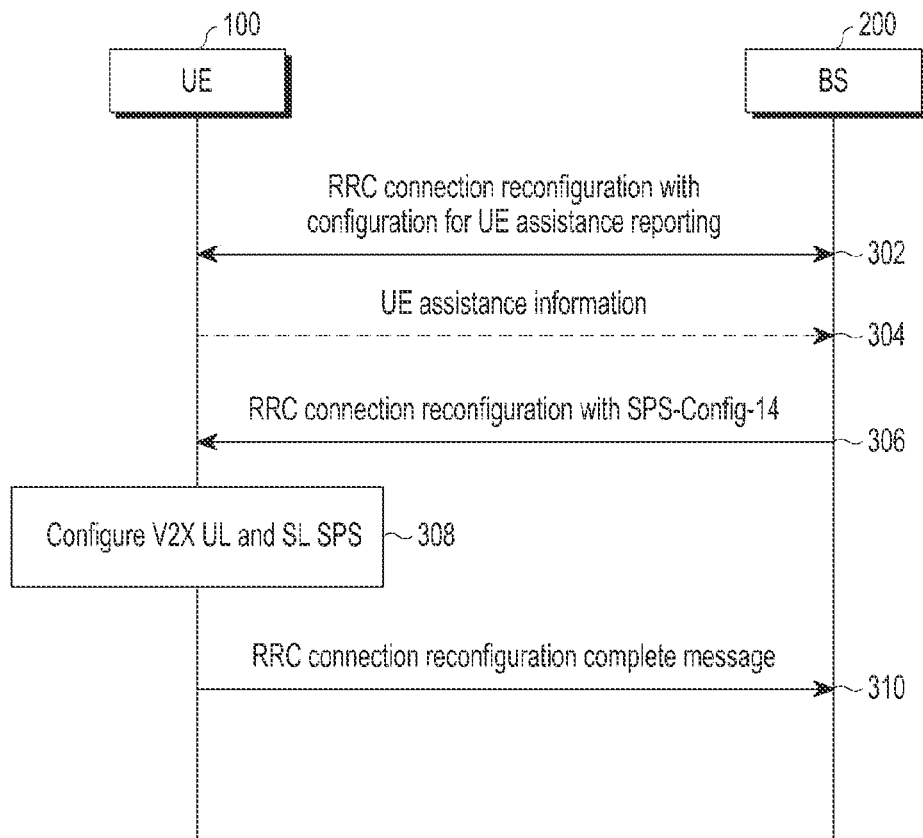
FIG. 3 is a sequential diagram of operations performed for managing a wireless communication in a V2X communication system, according to the present disclosure.

FIG. 3 is a sequential diagram of operations performed for managing wireless communication in the V2X communication system, according to an embodiment of the present disclosure.

The V2X communication system includes the UE 100 and the BS 200. The UE 100 can be, for example, a cellular phone, a smart phone, a Personal Digital Assistant (PDA), a wireless modem, a wireless communication device, a handheld device, a tablet computer, a laptop computer, and the RSU. The BS 200 may also include a base transceiver station, a radio base station, an access point, a radio transceiver, an eNB, a gNodeB (GNB), and a 5G eNB.

The UE 100 is configured to receive a first signaling message from the BS 200. The first signaling message includes assistance information for reporting a configuration of the V2X communication over at least one channel. After receiving the first signaling message from the BS 200, the UE 100 is configured to report the assistance information associated with at least one resource pattern required for the V2X communication over the at least one channel to the BS 20,0 based on the assistance information for reporting the configuration.

After reporting, the assistance information is associated with at least one resource pattern required for the V2X communication, and the UE 100 is configured to receive a second signaling message from the BS 200. The second signaling message includes the SPS configuration for the V2X communication over the at least one channel based on the assistance information. After receiving the second signaling message from the BS 200, the UE 100 is configured to set the SPS configuration for the V2X communication over the at least one channel. Further, the SPS controller 110 is configured to acknowledge the setting of the SPS configuration to the BS 200.

The UE 100 is further configured to release the SPS setting when at least one of a PDCCH contents indicate the SPS release, the configured number of empty transmissions on SPS grants is reached, and the timer associated with the SPS configuration is expired.

In FIG. 3, at 302, the RRC connection reconfigures with the configuration for the UE assistance reporting, which is exchanged between the UE 100 and the BS 200. At 304, the UE 100 sends the UE assistance information to the BS 200. At 306, the BS 200 sends the RRC connection reconfiguration with the SPS-Config-14 to the UE 100. At 308, the UE 100 configures the V2X UL and SL SPS. At 310, the UE 100 sends the RRC connection reconfiguration complete message to the BS 200.

In an embodiment of the present disclosure, multiple SPS settings for the V2X configuration is indicated over the RRC reconfiguration message.

Multiple SPS configuration indication over the RRC message: When multiple SPS configurations have been agreed to by both PC5 as well as Uu interface, a multiple SPS configuration message may be transmitted over the RRC. The SPS, as per current provisions in the 3GPP TS 36.321 specification, is supported only on downlink and uplink (i.e. on Uu only and single SPS), which is common for all logical channels. Current provisions indicate no SPS is supported on a PC5 side link.

There is a need to identify and differentiate the SPS configurations. An additional SPS may be mapped to a particular LCID or to a particular PPPP. Therefore, a new SPS configuration shall also cater towards mapping the specific SPS configuration to its associated LCID/PPPP. The SPS configuration for the V2X can be configured over an RRC reconfiguration message or any other RRC message with a non-critical extension for release 14, as shown in FIG. 3, such that there is a need to enhance an RRC specification to cater to a requirement of multiple SPS over both Uu and PC5 interfaces.

Method 1: Indication of required SPS configuration: Multiple SPSs are related to different periodicity and are mapped to different logical channels. There is a need to map the SPS with each logical channel or PPPP. Also, for every SPS, the UE 100 needs to indicate its periodicity as well as threshold timing offset. There are two procedure through which the BS 200 can configure the multiple SPS configuration.

1. Procedure for configuring the multiple SPS configuration: The BS 200 configures the UE 100 to send UE assistance information, which indicates the traffic characteristic like periodicity, data packet size, and timing, for a particular application. Upon receiving the UE assistance information, the UE 100 sends the UE assistance information to indicate possible periodicity of messages and other parameters. Once the BS 200 receives all this information, the BS 200 will configure the SPS configuration for different logical channels through the RRC message as depicted in the FIG. 3.

2. Procedure for configuring the multiple SPS configuration: The BS 200, based on its internal implementation, will configure the multiple SPS configuration for the UE100 through the RRC message and can later change multiple SPS configurations based on the feedback of the UE 100.

Method 2: Addition of new IE in the RRC message for PC5 and Uu interface: The UE 100 must map the SPS configuration with logical channel and its periodicity, so that the UE 100 can efficiently use the SPS grants. Current TS 36.331v13.3.0 does not support multiple SPS configurations The BS 200 can provide different SPS configurations for both PC5 and Uu interfaces. The mapping of the logical channel, or the PPPP per SPS id, can either be part of spsconfig or part of drb-ToAddModList in RadioResourceConfigDedicatedIE. The changes can be made in the TS 36.331 V13.3.0, section 6.3.2 under spsconfig. The same will be applicable for IE "RadioResourceConfigDedicated".

SPS-Config: The IE SPS-Config is used to specify the semi-persistent scheduling configuration, as shown below.

SPS-Config Information Element

```
-- ASN1START
SPS-Config ::= SEQUENCE {
    semiPersistSchedC-RNTI    C-RNTI         OPTIONAL,        -- Need OR
    sps-ConfigDL SPS-ConfigDL        OPTIONAL,      -- Need ON
    sps-ConfigUL S-ConfigUL                  OPTIONAL       -- Need ON
}
SPS-Config-r14 ::= SEQUENCE {
    semiPersistSchedC-RNTI       C-RNTI        OPTIONAL,        -- Need OR
    sps-ConfigUL-r14        SPS-ConfigUL OPTIONAL        --Need ON
sps-ConfigSL-r14 SPS-ConfigSL              OPTIONAL         --Need ON
}
SPS-ConfigUL-r14 ::= CHOICE{
      sps-id-r14        INTEGER (1..8)
release                     NULL,
    setup                     SEQUENCE {
    semiPersistSchedIntervalUL        ENUMERATED {
                                         sf10, sf20, sf32, sf40, sf64, sf80,
                                         sf128, sf160, sf320, sf640, spare6,
                                         spare5, spare4, spare3, spare2,
    sps-mappedLCID-r14      INTEGER (3..10)
    sps-mappedPPPP-r14      INTEGER (1..8)
                                 spare1},
    thresholdTimingOffset
    thresholdPeriodicity
}
SPS-ConfigSL-r14 ::= CHOICE{
      sps-id-r14        INTEGER (1..8)
release                     NULL,
    setup                     SEQUENCE {
    semiPersistSchedIntervalUL        ENUMERATED {
                                         sf10, sf20, sf32, sf40, sf64, sf80,
                                         sf128, sf160, sf320, sf640, spare6,
                                         spare5, spare4, spare3, spare2,
    sps-mappedLCID-r14      INTEGER (3..10)
    sps-mappedPPPP-r14      INTEGER (1..8)
                                 spare1},
    thresholdTimingOffset
    thresholdPeriodicity
}
SPS-ConfigDL ::= CHOICE{
    release                 NULL,
    setup                   SEQUENCE {
      semiPersistSchedIntervalDL         ENUMERATED {
                                         sf10, sf20, sf32, sf40, sf64, sf80,
                                         sf128, sf160, sf320, sf640, spare6,
                                         spare5, spare4, spare3, spare2,
                                         spare 1},
      numberOfConfSPS-Processes    INTEGER (1..8),
      n1PUCCH-AN-PersistentList    N1PUCCH-AN-PersistentList,
      ...,
      [[  twoAntennaPortActivated-r10    CHOICE {
             release                   NULL,
             setup                     SEQUENCE {
                n1PUCCH-AN-PersistentListP1-r10   N1PUCCH-AN-PersistentList
             }
          }                                              OPTIONAL  --
Need ON
      ]]
    }
}
```

-continued

```
SPS-ConfigUL ::= CHOICE {
    release                     NULL,
    setup                       SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }                       OPTIONAL,                          -- Need OP
        twoIntervalsConfig ENUMERATED {true}    OPTIONAL,          -- Cond TDD
        ...,
        [[ p0-PersistentSubframeSet2-r12    CHOICE {
            release                         NULL,
            setup                           SEQUENCE {
        p0-NominalPUSCH-PersistentSubframeSet2-r12 INTEGER (-126..24),
        p0-UE-PUSCH-PersistentSubframeSet2-r12     INTEGER (-8..7)
            }
        }                                           OPTIONAL    -- Need ON
        ]],
        [[ numberOfConfUlSPS-Processes-r13          INTEGER (1..8)     OPTIONAL
        --Need OR
        ]]
    }
}
N1PUCCH-AN-PersistentList ::=   SEQUENCE (SIZE (1..4)) OF INTEGER (0..2047)
-- ASN1STOP
```

SPS-Config field descriptions implicitReleaseAfter
Number of empty transmissions before
implicit release, refer TS 36.321 [6,
5.10.2]. Value e2 corresponds to 2 transmissions, e3 corresponds to 3
transmissionsand so on.
n1PUCCH-AN-PersistentList, n1PUCCH-AN-PersistentListP1
List of parameter: $n_{PUCCH}^{(1, p)}$ for antenna port P0 and for antenna port P1
respectively, refer TS 36.213 [23, 10.1]. Field n1-PUCCH-AN-
PersistentListP1 is applicable only if the
twoAntennaPortActivatedPUCCH-Format1a1b in
PUCCH-ConfigDedicated-v1020 is set to true. Otherwise the
field is not configured.
numberOfConfSPS-Processes
The number of configured HARQ processes for a downlink
Semi-Persistent Scheduling, refer TS 36.321 [6].
numberOfConfUlSPS-Processes
The number of configured HARQ processes for an uplink
Semi-Persistent Scheduling, refer TS 36.321 [6]. The
E-UTRAN always configures this field
for asynchronous UL HARQ. Otherwise it does not configure this field.
p0-NominalPUSCH-Persistent
Parameter: $P_{O\_NOMINAL\_PUSCH}(0)$. Refer
TS 36.213 [23, 5.1.1.1], unit dBm step
1. This field is applicable for persistent
scheduling, only. If choice setup is used and p0-Persistent
is absent, apply the value of p0-NominalPUSCH for p0-
NominalPUSCH-Persistent.If uplink power control subframe sets are
configured by tpc-SubframeSet, this field applies for uplink
power control subframe set 1.
p0-NominalPUSCH-PersistentSubframeSet2
Parameter: $P_{O\_NOMINAL\_PUSCH}(0)$. Refer
TS 36.213 [23, 5.1.1.1], unit dBm step
1. This field is applicable for persistent scheduling, only. If p0-
PersistentSubframeSet2-r12 is not configured, apply the value of p0-
NominalPUSCH-SubframeSet2-r12for p0-NominalPUSCH-
PersistentSubframeSet2.The E-UTRAN configures this field
only if uplink power control subframe sets are configured
by tpcSubframeSet, in which case
this field applies for an uplink power control subframe set 2.
p0-UE-PUSCH-Persistent
Parameter: $P_{O\_UE\_PUSCH}(0)$. Refer TS 36.213

-continued

SPS-Config field descriptions

[23, 5.1.1.1], unit dB. This field is
applicable for persistent scheduling, only.
If choice setup is used and p0-Persistent is absent,
apply the value of p0-UE-PUSCH for p0-UE-PUSCH-Persistent.
If uplink power control subframe sets
are configured by tpc-SubframeSet,
this field applies for uplink power control subframe set 1.
p0-UE-PUSCH-PersistentSubframeSet2
Parameter: $P_{O\_UE\_PUSCH}(0)$. Refer TS 36.213
[23, 5.1.1.1], unit dB. This field is
applicable for persistent scheduling, only.
If p0-PersistentSubframeSet2-r12
is not configured, apply the value of p0-UE-
PUSCH-SubframeSet2for p0-UE-
PUSCH-PersistentSubframeSet2.The E-UTRAN
configures this field only if
uplink power control subframe sets are
configured by tpc-SubframeSet, in
which case this field applies for the uplink power control subframe set 2.
semiPersistSchedC-RNTI
Semi-persistent Scheduling C-RNTI, refer TS 36.321 [6].
semiPersistSchedIntervalDL
Semi-persistent scheduling interval in the downlink, refer TS 36.321 [6].
Value in number of sub-frames.
Value sf10 corresponds to 10 sub-frames,
sf20 corresponds to 20 sub-frames and so on. For TDD, the UE 100 shall
round this parameter down to the nearest
integer (of 10 sub-frames), e.g. sf10
corresponds to 10 sub-frames, sf32 corresponds to 30 sub-frames, sf128
corresponds to 120 sub-frames.
semiPersistSchedIntervalUL
Semi-persistent scheduling interval in the uplink,
refer TS 36.321 [6]. Value
in number of sub-frames. Value sf10 corresponds to 10 sub-frames, sf20
corresponds to 20 sub-frames and so on.
For TDD, the UE 100 shall round
this parameter down to the nearest integer (of 10 sub-frames), e.g. sf10
corresponds to 10 sub-frames, sf32 corresponds to 30 sub-frames, sf128
corresponds to 120 sub-frames.

| SPS-Config field descriptions |
|---|
| twoIntervalsConfig
Trigger of two-intervals-Semi-Persistent Scheduling
in the uplink. Refer TS 36.321 [6, 5.10].
If this field is present, two-intervals-SPS is enabled for the
uplink. Otherwise, two-intervals-SPS is disabled.
sps-id-r14
Semi Persistent Scheduling identifier is an
integer value which identifies the SPS configuration
provided to the UE 100 for V2X communication for the
uplink (Uu) as well as Sidelink(PC5) communication.
sps-mappedLCID-r14
Semi-persistent scheduling mapping to the
LCID. The SPS configuration has
a dedicated mapping to a logical channel carrying data for V2X
communication. The value is integer value indicating the logical channel
id (i.e., LCID) to which the SPS confoguration is mapped to.
sps-mappedPPPP-r14
Semi-persistent scheduling mapping to the
Prose Per Packet Priority (PPPP).
The SPS configuration has the dedicated mapping to PPPP for the V2X
communication. The value is integer value indicating
the PPPP to which the SPS configuration is mapped to.
thresholdTimingOffset
Threshold for Timing offset. The field indicates the maximum change in
timing offset of data arrival on the SPS mapped PPPP/LCID, at which
the UE assistance information will be triggered.
thresholdPeriodicity
Threshold for SPS periodocity. Field indicates the maximum change in
periodicity of data arrival on the SPS mapped PPPP/LCID, at
which the UE assistance information wall be triggered |

Method 3: Release of Sidelink and Uu for multiple SPS resources: The SPS configuration on the sidelink and the Uu for the V2X is released in the following cases:

a) Intra LTE handover failure, b) T304 expiry, c) Radio link failure, d) RRC connection re-establishment, e) RRC connection reconfiguration with fullConfig, In other words, the default configuration of the SPS for the V2X (i.e., sps-ConfigSL/sps-ConfigSL-r14 and spsConfigUL-r14) is applied upon the event of any of the above procedures.

UE assistance information to support Multiple SPS configurations: Based on the V2X application, the V2X service, or the V2X traffic characteristics, the BS 200 configures the SPS grants for the UL, and configures the PC5 for the SL communication. Most data for the V2X are repetitive and periodic in nature. Therefore, it is easier for the BS 200 to allocate resource(s) in a semi persistent manner. The SPS is allocated in order to reduce a signaling aspect, and also to reduce latency arising from transmission of the scheduling request (SR) or buffer status report (BSR) caused by reception of grants or resource allocations to perform the transmission of pending data over the air interface.

A change in traffic or data/packet generation characteristics for the V2X services may be due to a change in the data size, the packet arrival time from upper layers for transmission, packet arrival rate from upper layers for transmission, and an additional V2X message being available for transmission. The BS 200 is not aware when the UE 100 generates the messages, and the SPS resource grants allocated by the BS 200 may not exactly match the actual message generation time, such that a mismatch between the actual message generation time and the SPS resource grant time will cause latency in the V2V service.

The BS 200 is provisioned to achieve better performance and optimum resource utilization along with reducing latency. To achieve this objective, the UE 100 sends feedback on changes in the traffic characteristics to the BS 200 over the UE assistance information. The periodicity indication over the UE assistance information indicates that the V2X packet arrival rate from the V2X application has changed and the present configured SPS periodicity is not optimal. The UE 100 suggests the required periodicity to the BS 200. The timing offset indicates a change in the packet arrival time form the application with respect to earlier packet arrival time for which SPS was configured. Therefore, the existing SPS configuration may not be optimal for the new packet arrival time (time offset is the drift in time—early arrival/late arrival—with respect to the arrival time of earlier received packets). This will assist the BS 200 to reconfigure the SPS such that the message is provided with transmission opportunity in a more optimum manner.

Figure 5:
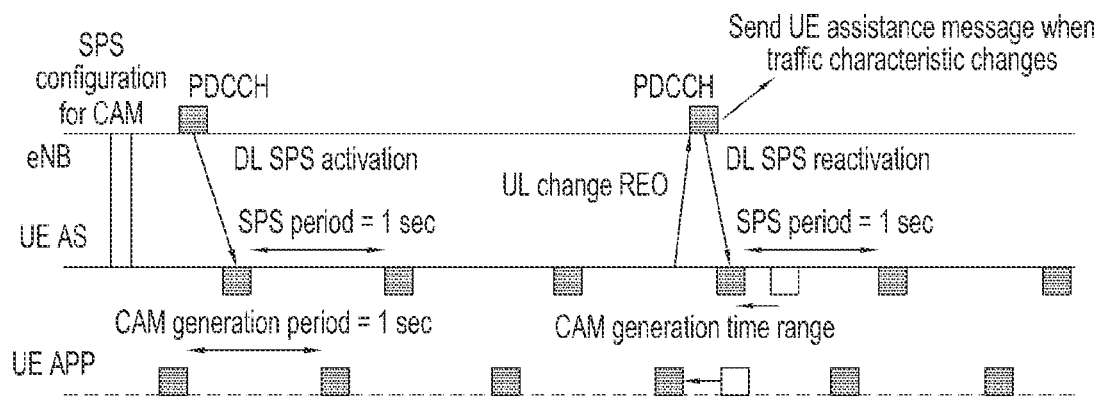
FIG. 5 is a schematic diagram of the UE informing a traffic pattern of a V2X service to the BS, according to the present disclosure.

The UE assistance information shall be triggered, as shown in the FIG. 5, if any of the following events a)-c) occur.

a) prohibit-Timer/T3xx expires or has expired and the packet arrival time or packet data size changed more than threshold offset as configured by the BS 200 for at least one logical channel or PPPP or SPS configuration. The threshold can reflect the periodicity (i.e., if periodicity of the arrival packet changes by a specific time) or it can be the size of the data packet (i.e. if data packet changes by a specific amount).

b) configuration or reconfiguration of the V2X logical channel for the Uu as well as PC5 (sidelink) interface.

c) if the V2X traffic characteristic is different from the V2X traffic characteristic indicated in the last transmission of the UE assistance information and timer T3xx is not running.

The UE assistance information is sent to the serving BS, along with additional information about the expected periodicity, time offset, and the amount of sidelink or V2X data available for transmission in the SL buffer/UL buffer associated with a corresponding MAC entity. This feedback can be sent to the network in the following ways a)-c), below.

a) As a new RRC message, b) As a new IE or modifying an existing RRC message, and c) As a new MAC control element (MAC CE).

Method 1: Indication of UE assistance information as a new RRC message or as part of an existing RRC message: The method indicates the UE's V2X traffic characteristics to the BS 200. Upon configuring the UE 100 to V2X traffic characteristics indications, the BS 200 may consider that there is need to change the SPS configuration for a specific logical channel, PPPP or for a specific SPS id, so that resources can be utilized properly and the V2X messages can be transferred without delay. The UE 100 capable of providing the V2X traffic characteristics in a RRC_CONNECTED state may initiate the procedure in several cases based on the V2X traffic characteristics and change of V2X traffic characteristics.

Figure 4A:
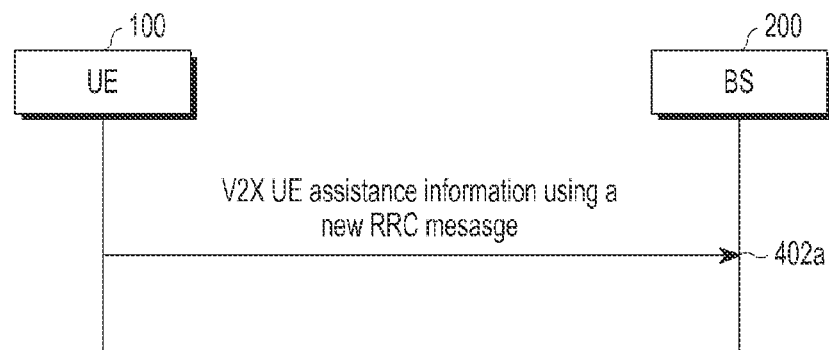
FIG. 4A is a sequential diagram of a UE reporting UE assistance information to a BS over a new RRC message, according to the present disclosure.
Figure 4B:
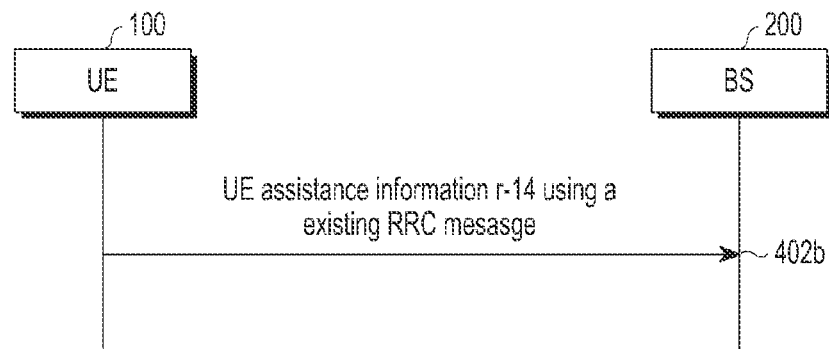
FIG. 4B is a sequential diagram of the UE reporting the UE assistance information to the BS over an existing RRC message by adding new information elements, according to the present disclosure.

When the associated triggers related to the V2X traffic characteristics are satisfied, UE assistance information is triggered. The UE assistance information can be sent using the new RRC message or by modifying existing RRC messages, or through any other RRC message as illustrated in FIGS. 4A and 4B. (i.e., V2X UE assistance information r14 and UE assistance information r14). The UE assistance information procedure is used to provide the information about the expected packet size per transmission, the packet arrival time, the packet arrival rate to the serving BS 200 (e.g., serving eNB). This procedure is only valid for the logical channels or the PPPP which have the dedicated SPS configuration. The RRC also includes the SPS ID, the logical channel ID, or the PPPP.

FIG. 4A is a sequential diagram illustrating the UE 100 reporting of the UE assistance information to the BS 200 over the new RRC message, according to an embodiment. At 402a, the UE 100 sends the V2X UE assistance information using the new RRC message.

FIG. 4B is a sequential diagram illustrating the UE 100 reporting of the UE assistance information to the BS 200 over an existing RRC message by adding new IE, according to an embodiment. At 402b, the UE 100 sends the UE assistance information (i.e., r-14) using the existing RRC message.

For a UE 100 with an existing SPS for V2X, communication, the UE assistance information contains the change in packet size/expected packet size, change in packet arrival time (i.e., time offset with earlier packet arrival), change in packet arrival rate/new packet arrival rate/periodicity, logical channel id, PPPP id, and SPS id. The UE 100 can identify that an additional V2X session or service is ongoing based on the packet arrival for the transmission. When the new packet arrival characteristics include both earlier packet characteristics with certain additions (like packet arrival rate and packet size originating from the new V2X session), the UE 100 can send UE assistance information. The BS 200 receives the UE assistance information and can either provide a new SPS configuration in addition to the existing SPS or modify the existing SPS for that specific logical channel or PPPP, and can inform the same to the UE 100 through the RRC message as shown in the FIG. 4A. The additional SPS may either be for the same logical channel or PPPP, or the new logical channel or PPPP.

An IE carried by UE assistance information is shown below.

```
UEAssistanceInformation-r14-IEs::= SEQUENCE {
Periodicity of data arrival
Size of data
Timing offset
}
```

Upon receiving the UE assistance information, the BS 200 can configure the SPS configuration for an existing logical channel or configure a new logical channel with a new SPS configuration through an RRC reconfiguration message.

Method 2: Control for trigger of UE assistance information: The BS 200 can configure the parameters to control the trigger for UE assistance information. Since the UE assistance information is reported by the RRC message upon any of the earlier mentioned trigger conditions being satisfied, the trigger conditions remain satisfied for as long as there is a new change in the traffic characteristics. Therefore, controlling frequent reporting and duplicate assistance information to the BS 200 will lead to an increase in signaling overhead.

The rules mentioned in this section are applicable for any reporting system, such as an RRC message, or a MAC CE element, which will be explained later below. The BS 200 controls the UE assistance information reporting through the RRC message by configuring few parameters like: Timer T3xx/prohibit timer: This timer can be configured in any RRC message by the BS 200.

The prohibit timer is required to restrict frequent transmission of the UE assistance information to the BS 200. This may be configured as a regular RRC timer, such as T3xx. The timer will work as shown below.

| Start | Stop | Expiry |
|---|---|---|
| The UE 100 can start the timer once the RRC sends the UE assistance information to the BS 200. | The UE 100 can stop this timer if it receives RRC connection reconfiguration with new or updated SPS configuration related to UE assistance reporting based IEs. | The UE 100 can initiate new UE assistance information if any of trigger condition satisfies. |

In addition to controlling a transmission rate/frequency of duplicate UE assistance information, it is also important to control the number of times the same message is transmitted to the BS 200. Therefore, the count value is also configured to report the UE assistance information to the BS 200. This count value provides the maximum number of transmissions allowed for the same UE assistance information. When the timer is expired, if a maximum number of allowed transmissions for the UE assistance information is not performed, then the BS 200 performs transmission of the same UE assistance information. If the UE assistance information is reported for a maximum allowed number of times, then the BS 200 removes the pending UE assistance information which timer T3xx was running.

When the UE assistance information is transmitted and the BS 200 has not sent an updated RRC connection reconfiguration, and the traffic characteristics change sufficiently to satisfy the trigger conditions for reporting the UE assistance information, then the old version of the UE assistance information is cleared and the latest version of the UE assistance information is transmitted. The counter controlling the count of transmission of the UE assistance information is reset in this scenario.

Variables or configurations related to control of the UE assistance information report may either come as port of sps-ConfigUL-r14/sps-ConfigSL-r14/sps-Config-r14, or as part of a new IE in the RRC connection reconfiguration (e.g., V2XUEassistance-r14/UEAssistance-r14).

Any triggered and available UE assistance information is cleared on the event of any of the following procedures a)-e).
a) Intra LTE handover failure
b) T304 expiry
c) Radio Link failure
d) RRC connection re-establishment
e) RRC connection reconfiguration with fullConfig After re-establishment to the LTE cell, the new UE assistance information is triggered, if the trigger conditions, as mentioned earlier, are satisfied.

Indication of the UE assistance information through new MAC CE: Another way of indicating the UE assistance information to the BS 200 is via the MAC control element. Indication via the MAC CE is faster and provides a lower latency, as the UE assistance information can be transmitted over the next available uplink resource to the UE 100. However, there are no provisions in the 3GPP TS 36.321 to report the UE assistance information and hence a new MAC CE has to be formed for this purpose. The triggers for the UE assistance information is the same as already mentioned. The MAC CE indicates a change in the traffic characteristics. The UE assistance information shall be triggered if any of the following events, a)-c), occur:
a) if prohibit-Timer/T3xx expires or has expired and the packet arrival time or packet data size or timing offset changed more than a threshold offset as configured by the BS 200 for at least one logical channel, PPPP, or SPS configuration,
b) upon configuration or reconfiguration of the V2X logical channel for Uu as well as PC5 (sidelink) interface, and
c) if the V2X traffic characteristics is different from the one indicated in the last transmission of the UE assistance information message and timer T3xx/prohibit timer is not running.

Since there are multiple MAC CEs supported by the UE100, it is important to add an identifier for identifying the UE assistance information related MAC CE and to distinguish it. Therefore, a new logical channel identifier (e.g., LCID) is needed for the UE assistance information CE. This is part of a fixed sized MAC sub-header associated to the MAC CE. Also, since the UE assistance information can be triggered by changes in the traffic characteristics over the Uu interface, the PC5 interface, and a combination of the Uu interface and the PC5 interface, it is important that there are distinct identifiers to distinguish the UE assistance information for the Uu interface from that of the UE assistance information for the PC5 interface. When the logical channel numbers are the same for both Uu and PC5, then there is no need to differentiate the MAC CE from the UE assistance for both Uu and PC5 interfaces. Therefore, one of the following approaches, a)-b), are needed:
a) 2 separate LCIDs—1 LCID for MAC CE for Uu, and another LCID for MAC CE for PC5, and
b) Single LCID—1 bit in MAC CE indicating whether the CE is for Uu or PC5.

Method 1: Indication of UE assistance information through MAC CE over separate LCID: In this case, there are separate LCIDs configured for the UL and the SL MAC CE as shown in Table 1 of FIG. 10. Table 1 shows values of the LCID for the UL-SCH.

The MAC sub-header consist of a reserved bit 'R', Format2 field 'F2', Extension bit 'E' and 5 bit LCID field as shown in Table 2 of FIG. 11. Table 2 illustrates the MAC subheader for MAC CE for the UE assistance information.

The various fields mentioned in this subheader are described below in a) and b):
a) LCID: The Logical Channel ID field identifies the logical channel instance of the corresponding MAC CE (i.e. whether it is Uplink UE assistance or V2X UE assistance).
b) F2: The format F2 field value is set to 0

Method 2: Indication of UE assistance information through MAC CE over same LCID: In this case, there is common LCIDs configured for UL and SL MAC CE for the UE assistance information reporting as shown in Table 3 of FIG. 12.

The MAC sub-header consists of uplink/sidelink field 'U/S', Format2 field 'F2', Extension bit 'E' and 5 bit LCID field. Table 2 of FIG. 11 shows Values of LCID for UL-SCH as shown in Table 4 of FIG. 13.

Table 4 illustrates the MAC subheader for the MAC CE for the UE assistance information. The field mentioned in this subheader are described as a), below:
a) U/V field: This will tell whether the UE assistance is for a Uu V2X logical channel or for a sidelink logical channel. The value 0 means it is for a Uu V2X logical channel and 1 means it is for a V2X sidelink logical channel.

Method 3: Format for the MAC CE for the UE assistance information: The MAC CE for the UE assistance may carry either UE assistance information of only one single SPS process at a time. A fixed sized MAC CE and its sub header is added to the uplink TB to indicate the BS 200 a change in traffic characteristics. In such a case, the MAC CE will contain a 3 bit SPS ID filed, a 4 bits periodicity field, 8 bits timing offset field, and one reserved 'R' bit. Additionally, 8 bit data size field may also be added to the MAC CE for UE assistance as shown in Table 5 of FIG. 14.

Table 5 illustrates a format for MAC CE carrying UE assistance information. The various fields mentioned in this MAC CE are described as below.

SPS id is a 3 bit SPS id field that indicates the ID of the SPS configuration on which the UE assistance information is triggered.

Periodicity is a 4 bit periodicity field that indicates the SPS periodicity that is required for this V2X session based on the values of SPS periodicity provisioned in the 3GPP TS 36.331 specifications and is currently restricted to a maximum of 16 possible values including all the spare bit fields. Therefore, a maximum of 4 bits are sufficient to indicate periodicity to a current network. If a number of SPS periodicity values are increased to more than 16 bits (example, 24 bits), more than 4 bit fields are required for indicating periodicity a value (i.e., 5 bit periodicity can address up to 32 SPS periodicity values if extended).

Time offset: 5 bit time offset field indicates to the network about a change in packet arrival time from upper layers for transmission (i.e., drift/delta in packet arrival time w.r.t earlier arrival times). This can either be a negative value to indicate early packet arrival to the network, or a positive value to indicate a latency or lag in packet arrival from upper layers for transmission.

Data Size: 8 bit data size fields indicate the size (or change in size) of the V2X data packets that are pending transmission. This will help the network in reconfiguring the TB size allocated over SPS. The UE 100 and the BS 200 can map each index to a specific range of data or a data size. The UE can simply indicate the index, instead of actual data, and a size of the data size field can be further reduced from 4-bit or 6-bit (which depends upon the number of sizes defined).

Additionally, it is also possible that the MAC CE for UE assistance may be triggered for multiple UE active SPS configurations. In such cases, sending independent MAC CEs for UE assistance separately for each of the configured CEs may not be optimal. In such cases, a variable sized MAC CE for UE assistance is more efficient in terms of latency and in terms of resource utilization as each MAC CE is associated to a MAC subheader.

In such cases, the MAC CE structure is as illustrated in Table 6 of FIG. 15.

Table 6 illustrates a format for a MAC CE carrying the UE assistance information for multiple SPSs. The 3 bit SPS ID fields indicate the SPS configuration index for which the UE assistance is reported. Up to N sets of UE assistance information can be sent over the single MAC CE where N represents the maximum number of SPS IDs that can be configured to the UE 100 for the V2X services (i.e. MAC CE for the UE assistance can carry the UE assistance information for up to 8 SPS configurations at a time).

Release of SPS configuration: The SPS in the uplink can be released according to either a) or b):
a) Explicit release—The PDCCH order indicating SPS release, and
b) Implicit release—The UE 100 is implicitly released after the configured number of empty transmissions on the SPS grants is achieved. This configuration will be provided by the BS 200.

The occurrence of both these methods of release of the SPS is determined by the BS 200 as the communication from the UE 100 in the uplink with the BS 200. However, the methods to release the SPS on the SL is not present in the current versions of release 13 3GPP specifications. The explicit method of releasing SPS via a PDCCH order is still applicable for the sidelink SPS release. It is necessary to be indicated to the BS 200 explicitly about any implicit SPS release of a sidelink (SL) PC5 SPS configuration, so that the BS 200 can efficiently use these resources.

Method 1: Timer based SPS configuration: For sidelink, it is possible that the BS 200 configures the SPS only for a limited duration of time based on the type of V2X service and the traffic characteristics associated to the BS 200. In such cases, the BS 200 configures the SPS on the SL to the UE 100 for a fixed duration of time. The SPS may be configured either in terms of milliseconds/seconds, in terms of number of PUSCH subframes/number of SL transmission subframes/sidelink transmission windows, or number of SPS grants on sidelink. Therefore, once an allocated validity time of the sidelink SPS expires, the SPS configuration on the sidelink is released based on the BS based configuration, the UE 100 does not have to indicate the SPS release to the BS 200.

The BS 200 may configure a timer for SPS configuration over SL, and the UE 100 can start and restart the timer once SPS configuration is used. Once this timer expires then the UE 100 needs to indicate to the BS 200 about the SPS release over sidelink, as mentioned below.

Method 2: Indication of Implicit release of SPS configuration: It is not always true that the BS 200 is aware of the duration for which V2X message is available for transmission at the UE 100. Therefore, the BS 200 is not aware of termination of the V2X session, and the BS 200 cannot configure the time based on SPS grant count or the SPS configuration release on the sidelink. Hence, it is easier for the BS 200 to configure a maximum count for empty transmissions after which the UE 100 releases the SPS configuration. The UE 100 configured with maximum count for empty transmissions on the sidelink will release the SPS configuration if it has no valid data to transmit over configured maximum consecutive sidelink SPS grants. In this case, the UE 100 is not able to use the dedicated SPS grants due to power limitation over the Uu or Pc5 interface for the V2X logical channel, and the UE 100 should not increment the counter to trigger the implicit release of SPS resources.

The release of SPS on the sidelink is performed implicitly by the UE 100 and the sidelink is not aware to the BS 200. Therefore, it is imperative to determine the BS 200 of the SPS release on the sidelink so that the BS 200 no longer has to reserve these grants for the UE 100. There is no provision for this as per release 13 of 3GPP specification. Hence, a new mechanism is required to indicate a SL SPS release to the BS 200. One way of achieving this is by indicating the SPS release to the BS 200 using a new MAC control element (CE). Like every other MAC CE, this new CE will also require a fixed sized MAC subheader in order to identify the MAC CE for SPS deactivation or release on the sidelink. Table 7 of FIG. 16 shows values of LCID for UL-SCH which indicates that this MAC subheader is for SPS release indication.

The MAC sub-header consist of reserved bit "R", Format2 field "F2", Extension bit "E" and 5 bit LCID field as shown in Table 8 of FIG. 17.

Table 8 illustrates the MAC subheader for release or deactivation of SPS resources.

The MAC CE format for release or deactivation of SPS resources is shown in Table 9 of FIG. 18. Table 9 illustrates a 1 Byte MAC CE for a case when multiple SPS releases may trigger the MAC CE. In this case, each bit in the MAC CE belongs to an associated SPS id (up to 8 SPS). The CE has a fixed size and consists of 8 SPS fields, each field corresponding to an SPS id. The $SPS_i$ field indicates that the SPS configuration and resources for the $i^{th}$ SPS configuration ($i^{th}$ SPS ID) when a sidelink is released. Value "1" indicates implicit release of that SPS ID.

Table 9 illustrates the MAC CE for indication of SPS release over sidelink.

Another way of representing MAC CE for implicit SPS release is by indicating a single SPS ID on which SPS has been released, as shown in Table 10 of FIG. 19. In such a case, a 3 bit SPS ID field is sufficient to indicate the SPS that has been implicitly released. The CE has a fixed size and consists of a 3 bit SPS ID field and five 1 bit reserved "R" fields. The 3 bit SPS ID field carries the ID of the sidelink SPS that has been released implicitly by the UE. Value "1" indicates implicit release of that SPS ID.

Table 10 illustrates the MAC CE for indicating a SPS release over sidelink.

For the explicit release, BS 200 can send PDCCH order over Uu or PC5 interface. The UE 100 can also assist the BS 200 to achieve this. The UE 100 will already be aware that the particular application is over and it does not need further resources. The possible options, a)-e), to achieve this is as below.

a) UE can send BSR report as "0" or zero. The BS 200 on receiving the same can send a PDCCH order to release the SPS grants.
b) This BSR can be sent over sidelink BSR or through new BSR for V2X logical channels over uplink communication. In this BSR, UE will set the value of that specific (V2X) logical channel as zero for releasing the connection.
c) Another trigger to generate the sidelink BSR, V2X specific BSR or existing BSR, is if any of the V2X channels do not want further dedicated SPS resources, then it can send the BSR report.
d) Another alternative in UE assistance information MAC CE, UE 100 can send the value as zero for parameters mentioned above which can indicate the BS 200 that the UE 100 did not need further resources.
e) Another alternative is to use the reserve bit (or a 1 bit field) of UE assistance MAC CE to indicate that the associated SPS id has no data pending for transmission.

Figure 6:
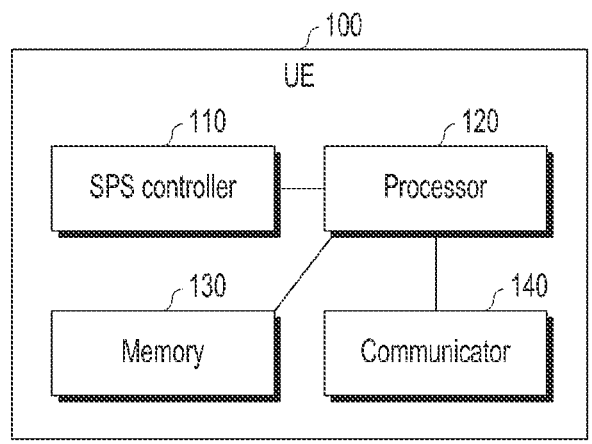
FIG. 6 illustrates a block diagram of the UE, according to the present disclosure.

FIG. 6 is a block diagram of the UE 100, according to an embodiment as disclosed herein. The UE 100 includes a SPS controller 110, a processor 120, a memory 130, and a communicator 140. The SPS controller 110 is operably coupled to the processor 120, the memory 130, and the communicator 140.

The SPS controller 110 is configured to receive a first signalling message from the BS 200. The first signalling message includes the assistance information for reporting configuration of the V2X communication over at least one channel. After receiving the first signalling message from the BS 200, the SPS controller 110 is configured to report the assistance information associated with at least one resource pattern required for the V2X communication over the at least one channel to the BS 200, based on the assistance information for reporting configuration.

After reporting the assistance information associated with at least one resource pattern required for the V2X communication, the SPS controller 110 is configured to receive a second signalling message from the BS 200. The second signalling message includes the SPS configuration for the V2X communication over the at least one channel based on the assistance information. After receiving the second signalling message from the BS 200, the SPS controller 110 is configured to set the SPS configuration for the V2X communication over the at least one channel. Further, the SPS controller 110 is configured to acknowledge the setting of the SPS configuration to the BS 200.

The SPS controller 110 is further configured to release the SPS configuration when at least one of a PDCCH contents indicate the SPS release, a configured number of empty transmissions on SPS grants is reached, and a timer associated with the SPS configuration expires.

Further, the processor 120 is configured to execute instructions stored in the memory 130 and to perform various processes in the V2X communication system. The communicator 140 is configured for communicating internally between internal hardware components and with external devices via one or more networks. The communicator 140 is configured for communicating with the SPS controller 110 to manage wireless communication in the V2X communication system.

The memory 130 stores the SPS configuration information and instructions to manage wireless communication in the V2X communication system. The memory 130 also stores instructions to be executed by the processor 120 and may include non-volatile storage elements, such as non-volatile storage elements that may include magnetic hard discs, optical discs, floppy discs, flash memories, or forms of electrically programmable memories (EPROM) or electrically erasable and programmable (EEPROM) memories. In addition, the memory 130 may be considered a non-transitory storage medium. The term "non-transitory" indicates that the storage medium is not embodied in a carrier wave or a propagated signal. However, the term "non-transitory" should not be interpreted that the memory 130 is non-movable. In some examples, the memory 130 can be configured to store larger amounts of information. In certain examples, a non-transitory storage medium may store data that can, over time, change (e.g., in random access memory (RAM) or cache).

Although FIG. 6 shows the hardware components of the UE 100, it is understood that other embodiments are not limited to hardware components. The UE 100 may include more or less components. Further, the labels or names of the components are used only for illustrative purpose and do not limit the scope of the present disclosure. One or more components can be combined together to perform the same or a substantially similar function to manage wireless communication in the V2X communication system.

Figure 7:
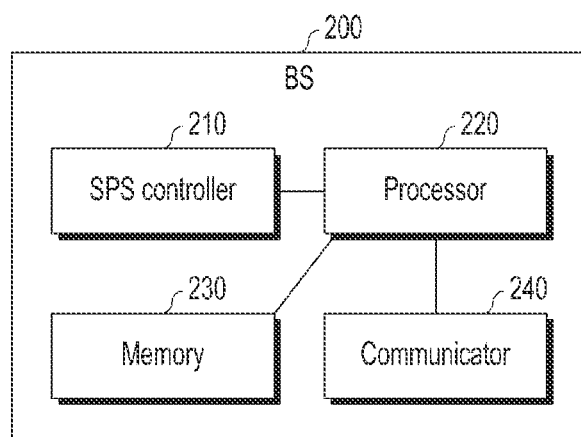
FIG. 7 illustrates a block diagram of the BS, according to the present disclosure.

FIG. 7 is a block diagram of the BS 200, according to an embodiment as disclosed herein. The BS 200 includes a SPS controller 210, a processor 220, a memory 230, and a communicator 240. The SPS controller 210 is operably coupled to the processor 220, the memory 230, and the communicator 240.

The SPS controller 210 is configured to send the first signalling message to the UE 110. The first signalling message includes the assistance information for reporting configuration of the UE for V2X communication over at least one channel. After sending the first signalling message to the UE 100, the SPS controller 210 is configured to receive assistance information associated with at least one resource pattern required for the V2X communication over the at least one channel from the UE 100 based on the assistance information for reporting configuration.

After receiving the assistance information associated with at least one resource pattern required for the V2X communication from the UE 100, the SPS controller 210 is configured to set a second signalling message including the SPS configuration of the UE for the V2X communication over the at least one channel based on the assistance information. The SPS controller 210 is further configured to send the second signalling message to the UE 100 and to receive an acknowledging message corresponding to the setting of the SPS configuration at the UE 100.

The processor 220 is configured to execute instructions stored in the memory 230 and to perform various processes in the V2X communication system. The communicator 240 is configured for communicating internally between internal hardware components and with external devices via one or more networks. The communicator 240 is configured for communicating with the SPS controller 210 to manage wireless communication in the V2X communication system.

The memory 230 stores the SPS configuration information and instructions to manage wireless communication in the V2X communication system. The memory 230 also stores instructions to be executed by the processor 220 and may include non-volatile storage elements, such as non-volatile storage elements including magnetic hard discs, optical discs, floppy discs, flash memories, or forms of EPROM or EEPROM memories. In addition, the memory 230 may be considered a non-transitory storage medium. The term "non-transitory" indicates that the storage medium is not embodied in a carrier wave or a propagated signal. However, the term "non-transitory" should not be interpreted to mean that the memory 230 is non-movable. In some examples, the memory 230 can be configured to store larger amounts of information. In certain examples, a non-transitory storage medium may store data that can, over time, change (e.g., in Random Access Memory (RAM) or cache).

Although FIG. 7 shows hardware components of the BS 200, it is to be understood that other embodiments are not limited to hardware components. The BS 200 may include more or less components. Further, the labels or names of the components are used only for illustrative purposes and do not limit the scope of the present disclosure. One or more components can be combined together to perform the same or substantially similar functions to manage wireless communication in the V2X communication system.

Figure 8:
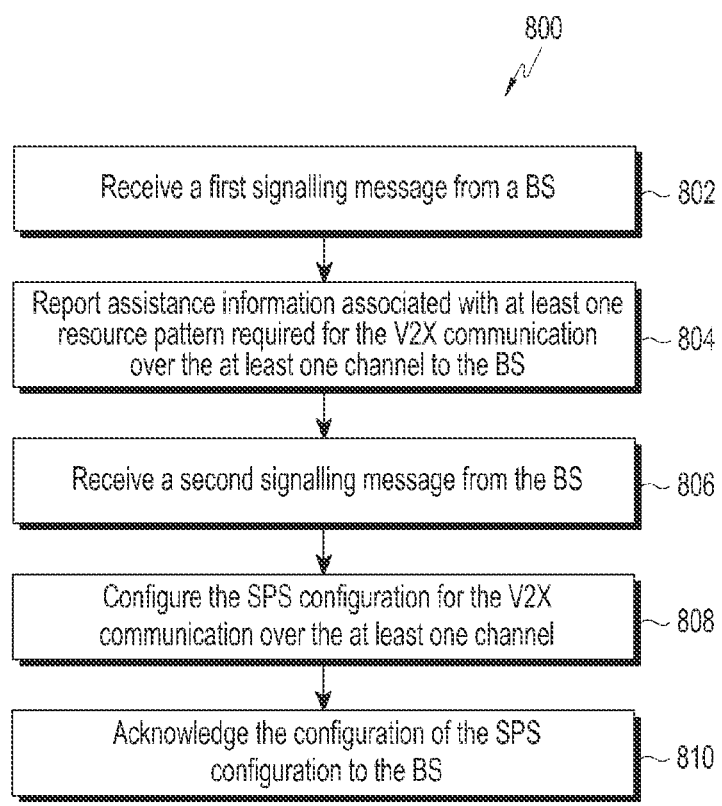
FIG. 8 is a flow diagram of a method implemented on the UE for managing wireless communication in the V2X communication system, according to the present disclosure.

FIG. 8 is a flow diagram 800 of a method implemented on the UE 100 for managing wireless communication in the V2X communication system, according to an embodiment of the present disclosure. The steps 802-810 are performed by the SPS controller 110.

At step 802, a first signalling message is received from the BS 200. The first signalling message includes the assistance information for reporting configuration of the V2X communication over at least one channel. At step 804, the assistance information associated with at least one resource pattern required for the V2X communication over the at least one channel is reported to the BS 200 based on the assistance information for reporting configuration. At step 806, a second signalling message is received from the BS 200. The second signalling message includes the SPS configuration for the V2X communication over the at least one channel based on the assistance information. At step 808, the SPS configuration is set for the V2X communication over the at least one channel. At step 810, the configuration of the SPS configuration is acknowledged to the BS 200.

The various actions, acts, blocks, steps, or operations in the flow diagram 800 may be performed in the order presented, in a different order or simultaneously. Further, in some embodiments, some of the actions, acts, blocks, steps, or operations may be omitted, added, modified, or skipped without departing from the scope of the present disclosure.

Figure 9:
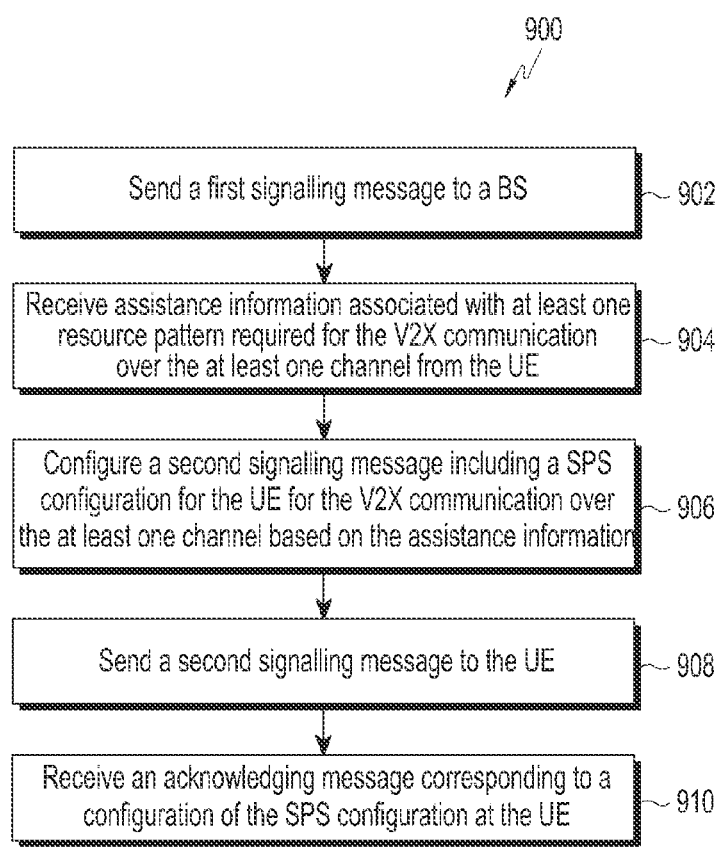
FIG. 9 is a flow diagram of a method implemented on the BS for managing wireless communication in the V2X communication system, according to the present disclosure.

FIG. 9 is a flow diagram 900 of a method implemented on the BS 200 for managing wireless communication in the V2X communication system, according to an embodiment of the present disclosure. The steps 902-910 are performed by the SPS controller 210. At step 902, a first signalling message is sent to the UE 100. The first signalling message comprises the assistance information for reporting configuration of the UE 100 for the V2X communication over at least one channel. At step 904, the assistance information associated with at least one resource pattern required for the V2X communication over the at least one channel is received from the UE 100 based on the assistance information for reporting configuration. At step 906, the second signalling message including the SPS configuration for the UE 100 for the V2X communication over the at least one channel is configured based on the assistance information. At step 908, the second signalling message is sent to the UE 100. At step 910, the acknowledging message corresponding to the configuration of the SPS configuration is received at the UE 100.

The various actions, acts, blocks, steps, or operations in the flow diagram 900 may be performed in the order presented, in a different order or simultaneously. Further, some of the actions, acts, blocks, steps, or operations may be omitted, added, modified or skipped, without departing from the scope of the present disclosure.

The embodiments of the present disclosure can be implemented using at least one software program running on at least one hardware device and performing network management functions to control elements.

The foregoing description of the specific embodiments can be modified by applying current knowledge, readily modifying and/or adapting for various applications within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the spirit and scope of the embodiments as described herein.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:

1. A method performed by a user equipment (UE) in a sidelink communication system, the method comprising:
    receiving, from a base station (BS), configuration information;
    identifying that the configuration information includes assistance configuration information indicating that the UE is configured to provide assistance information for a sidelink communication; and
    in case that the UE is configured to provide the assistance information for the sidelink communication based on the assistance configuration information, and that a traffic pattern of the UE is changed, initiating a transmission of the assistance information for the sidelink communication to the BS,
    wherein the assistance information comprises information on the traffic pattern of the UE.

2. The method of claim 1, wherein the traffic pattern comprises a data size, a periodicity and a timing offset.

3. The method of claim 2, wherein the periodicity indicates an estimated data arrival periodicity, the timing offset indicates a time offset with respect to a subframe of a predefined system frame number (SFN) and the data size indicates a maximum transport block (TB) size based on an observed traffic pattern.

4. The method of claim 1, wherein the assistance information is included in a radio resource control (RRC) message.

5. A method performed by a base station (BS) in a sidelink communication system, the method comprising:
    transmitting, to a user equipment (UE), configuration information; and
    receiving, from the UE, assistance information for a sidelink communication, in case that the UE is configured to provide the assistance information for the sidelink communication based on assistance configuration information included in the configuration information, and that a traffic pattern of the UE is changed,
    wherein the assistance configuration information indicates that the UE is configured to provide the assistance information for the sidelink communication, and
    wherein the assistance information comprises information on the traffic pattern of the UE.

6. The method of claim 5, wherein the traffic pattern comprises a data size, a periodicity and a timing offset.

7. The method of claim 6, wherein the periodicity indicates an estimated data arrival periodicity, the timing offset indicates a time offset with respect to a subframe of a predefined system frame number (SFN) and the data size indicates a maximum transport block (TB) size based on an observed traffic pattern.

8. The method of claim 5, wherein the assistance information is included in a radio resource control (RRC) message.

9. A user equipment (UE) in a sidelink communication system, the UE comprising:
    a transceiver; and
    at least one processor coupled to the transceiver,
    wherein the at least one processor is configured to:
        receive, from a base station (BS), configuration information;
        identify that the configuration information includes assistance configuration information indicating that the UE is configured to provide assistance information for a sidelink communication; and
        in case that the UE is configured to provide the assistance information for the sidelink communication based on the assistance configuration information, and that a traffic pattern of the UE is changed, initiate a transmission of the assistance information for the sidelink communication to the BS,
    wherein the assistance information comprises information on the traffic pattern of the UE.

10. The UE of claim 9, wherein the traffic pattern comprises a data size, a periodicity and a timing offset.

11. The UE of claim 10, wherein the periodicity indicates an estimated data arrival periodicity, the timing offset indicates a time offset with respect to a subframe of a predefined system frame number (SFN) and the data size indicates a maximum transport block (TB) size based on an observed traffic pattern.

12. The UE of claim 9, wherein the assistance information is included in a radio resource control (RRC) message.

13. A base station (BS) in a sidelink communication system, comprising:
a transceiver; and
at least one processor coupled to the transceiver,
wherein the at least one processor is configured to:
- transmit, to a user equipment (UE), configuration information, and
- receive, from the UE, assistance information for a sidelink communication, in case that the UE is configured to provide the assistance information for the sidelink communication based on assistance configuration information included in the configuration information, and that a traffic pattern of the UE is changed, wherein the assistance configuration information indicates that the UE is configured to provide the assistance information for the sidelink communication, and
wherein the assistance information comprises information on the traffic pattern of the UE.

14. The BS of claim 13, wherein the traffic pattern comprises a data size, a periodicity and a timing offset.

15. The BS of claim 14, wherein the periodicity indicates an estimated data arrival periodicity, the timing offset indicates a time offset with respect to a subframe of a predefined system frame number (SFN) and the data size indicates a maximum transport block (TB) size based on an observed traffic pattern.

16. The BS of claim 13, wherein the assistance information is included in a radio resource control (RRC) message.

* * * * *